United States Patent Office 3,518,519
Patented June 30, 1970

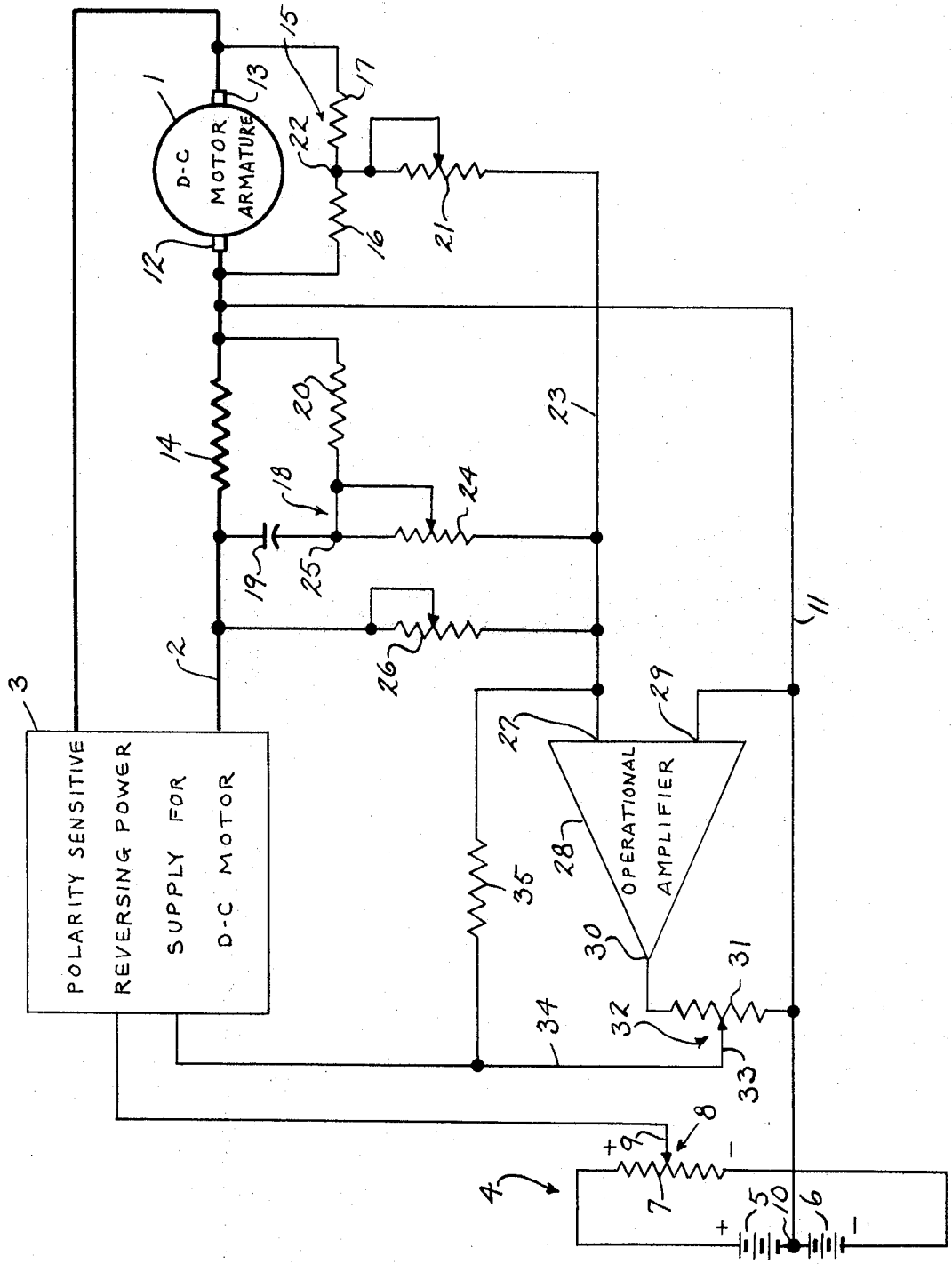

3,518,519
RIPPLE ELIMINATING ARMATURE FEEDBACK
D-C MOTOR SPEED CONTROL CIRCUIT
John E. Callan, Milwaukee, Wis., assignor to Allen-Bradley Company, Milwaukee, Wis., a corporation of Wisconsin
Filed Oct. 20, 1967, Ser. No. 676,861
Int. Cl. H02p 5/00
U.S. Cl. 318—308                                    9 Claims

ABSTRACT OF THE DISCLOSURE

A series resistor and a common base line are connected to one armature terminal of a shunt D-C motor, and a voltage divider is connected across both terminals. Three potentiometers which have ends in common connection to a summing point, are connected, respectively, to the voltage divider, to an R-C differentiating circuit across the series resistor, and to the series resistor. An operational amplifier is connected across the base line and the summing point. The outputs of the operational amplifier and a reference signal source are compared in an armature power supply producing an error signal to control the power supply.

BACKGROUND OF THE INVENTION

The present invention was initially created for a position control in a numerical control system for machine tools. In addition, the invention may be utilized for speed control as well as the position control of D-C motors, wherever accurate control is required. However, cost considerations, not operational limitations, may limit the commercial application of the present invention to relatively small motors, with which tachometers are not economically usable.

Accurate position or speed control of direct current motors is commonly achieved with tachometer feedback systems, but where the motor to be controlled is relatively small, such as fractional to five horsepower motors, the cost and space requirements of a tachometer, with the necessary asociated circuitry and mechanical connections are too great relative to the motor itself to permit or justify the use of tachometer controls. However, the accurate control of direct current motors without using a tachometer has proven difficult, if not impossible, to achieve. The counter EMF generated by a D-C motor, being proportional to motor speed, is frequently relied upon for a feedback signal for motor speed controls. However, D-C motors are powered by pulsating unidirectional current, instead of a steady state direct current, with a resulting large, ripple factor in any feedback voltage taken directly from the armature circuit of the motor. Since only the D-C component is usable as a feedback signal, this ripple factor is commonly eliminated with the conventional R-C filters, but such R-C filters are lag networks which introduce a delay into the feedback signal, and this delay can cause readily detachable and often obviously visible delays in the response of the motor control system. Many applications cannot tolerate such delays in response. Hence, a counter EMF feedback system has long been needed that would eliminate the ripple factor without employing a filter with its attendants lag characteristic. U.S. Pat. No. 3,229,182 deals with the same problem using a balanced bridge that includes the motor armature in series with a resistance and inductance in series with another resistance connected on opposite sides of one input terminal and a pair of resistances on opposite sides of the other input terminal. When the resistances in the prior art bridge are balanced, the ripple components of the inductor and the inductance of the armature cancel each other out, producing a D-C control signal at the output terminals of the bridge. To obviate the need for such a balanced inductance bridge, the present invention approaches the problem in an entirely different manner.

SUMMARY OF THE INVENTION

The D-C motor speed control circuit of the present invention samples a voltage across armature terminals of a D-C motor, armature current of said D-C motor and takes a differentiated sample of armature current, the armature terminal voltage sample being of opposite polarity relative to the armature current and differentiated armature current samples, and said samples are algebraically added to produce a feedback signal proportional to the counter EMF of the armature.

The algebraic addition of the voltages proportional to the armature terminal voltage, armature current and a differentiated armature current results in canceling of the ripple factor leaving only the D-C component of the counter EMF induced in the armature, which accurately reflects armature speed independently of the load on the motor. Since there is no ripple component remaining in the feedback signal, no filtering of the feedback signal is required, and the lag produced by the filter is thus eliminated. Hence, the present invention achieves a very fast response to variations in motor speed to make possible a very accurate motor speed control system for direct current motors. It is of cardinal importance that the present invention provides such a motor speed control with a minimum number of electrical components, and those components are the least expensive and most reliable of all electrical components, to wit: resistors and capacitors. Hence, it becomes possible to incorporate the present invention in all motor speed controls, whether or not the high level accuracy provided by the invention is necessary, inasmuch as the added cost to achieve the highly accurate control is minimal. This allows maximum standardization of motor speed control units with concomitant minimization of cost of production, distribution and maintenance of motor speed controls.

BRIEF DESCRIPTION OF THE DRAWING

The drawing is a schematic diagram of a D-C motor speed control circuit employing the present invention.

DESCRIPTION OF THE PREFERRED EMBODIMENT

A shunt field D-C motor is represented by its armature 1, which is connected through a main supply conductor 2 to a power supply 3, which is a block bearing the legend "polarity sensitive reversing power supply for D-C motor," to be energized by the power supply 3. The power supply 3 from the armature 1 may be any of the variety of different types of power supplies known to the art that may be appropriate to the particular needs of the circumstances.

Typically, however, the power supply 3 will be energized from an A-C power line (not shown) through a power transformer (not shown), which will have in series with its secondary a pair of parallel connected, oppositely oriented, silicon controlled rectifiers (not shown). The controlled rectifiers (not shown) will having firing circuits controlled by the circuitry of the present invention which will alternately fire one or the other of the control rectifiers depending upon the indicated polarity of armature current for the desired direction of armature 1 rotation, and the SCR (not shown) will fire during a greater or lesser amount of each half cycle, depending upon the demand of the control circuit for more or less power to the armature 1. With such a power supply 3, if the D-C motor is a fractional horsepower motor, say for example one twentieth of a horsepower to one horsepower, single phase half-wave rectification is all that will be needed. However, if the motor falls within the range of for example one horsepower to 7½ horsepower, single phase full-wave rectification will be provided, and three phase, full-wave rectification is provided for larger motors.

Although the invention is not limited in its applicability to any particular size motor, usually when the motor reaches the size of five horsepower or above it becomes economical to employ a tachometer control, thus obviating the need for an armature feedback control circuit, such as one embodying the present invention. Hence, it may be said that the object of the present invention is to provide a tachometer type of feedback signal without using a tachometer. It may be anticipated that a control circuit of the type involved here will most often be used with one quarter to one horsepower, shunt field, D-C motors, and its immediate intended application is as a positional control in a numerical control system for machine tools, although it is by no means limited to such uses.

In the lower left hand corner of the drawing, a reference signal source 4 is shown. As a power supply for the reference signal source 4, a pair of batteries 5 and 6 are provided, and the batteries 5 and 6 are connected in series across resistive element 7 of speed control potentiometer 8, which has a sliding contact 9. The batteries 5 and 6 are connected together at a junction 10 which is also connected to a common base line 11, which serves as a common reference level for the entire control system, and which could be a common ground. Hence, when the sliding contact 9 of the speed control potentiometer 8 is in the electrical center of the resistive element 7, zero speed is demanded of the motor 1. If the sliding contact 9 is moved upward, a reference signal is emitted calling for motor speed in one direction, which may arbitrarily be called forward, and as the sliding contact 9 is moved down below this center, the reference signal polarity is reversed so increasing motor speed in the reverse direction is called for. Such a speed control potentiometer 8 may be manually operated, or automatically actuated. However, the present invention may be employed with many other well known types of reference signal sources, and it could come from a phase sensitive discriminator of a positioning system which will dictate motor speed in proportion to the distance to go of a driven member. As is obvious in the foregoing a speed control of the present invention has bidirectional capability, and hence, although it should be self-evident, let it be explicitly noted that the invention is also usable in systems where the motor 1 is driven in one direction only.

The armature 1 has a pair of terminals 12 and 13, and a drop resistor 14 is connected between the power supply 3 and the terminal 12 of the armature 1 by the supply conductor 2. Hence, this series resistor 14 develops a voltage drop that is proportional to armature current. A voltage divider 15 made up of a pair of high ohmic value, series resistors 16 and 17 is connected across the terminals 12 and 13 of the armature 1 to develop a voltage drop proportional to the terminal voltage of the armature 1. The voltage divider 15 could be eliminated and a voltage could be taken directly across the armature terminals 12 and 13. The base line 11 is connected to the armature terminal 12 along with the series resistor 14 and the armature terminal 12. A differentiating circuit 18 is made up of a series R-C network connected across the series resistor 14, and it includes a capacitor 19 and a resistor 20.

A potentiometer 21 is connected from a junction 22 of the resistors 16 and 17 in the voltage divider 15 and a summing line 23. If the voltage divider 15 is eliminated, the potentiometer 21 would be connected directly to the armature terminal 13 to provide a voltage take-off across the armature 1. A second potentiometer 24 is connected from a junction 25 between the resistance 20 and the capacitor 19 of the differentiating circuit 18 and the summing line 23. A third potentiometer 26 is connected through the supply conductor 2 to the series resistor 14 and, at the other end, to the summing line 23. The summing line 23 is connected to one input terminal 27 of an operational amplifier 28, and another input terminal 29 of the operational amplifier 28 is connected to the base line 11. The summing line 23 could be referred to as a summing point to which the potentiometers 21, 24 and 26, serving as variable resistances here, are connected in common, and to which the input terminal 27 is also connected.

An output terminal 30 of the operational terminal 28 is connected to one end of a resistance element 31 of a feedback potentiometer 32, of the other end of which is connected to the base line 11. The feedback potentiometer 32 has a sliding contact 33 connected to a feedback conductor 34, the other end of which is connected to the power supply 3. An amplifier feedback resistor 35 for the operational amplifier 28 is connected from the feedback conductor 34 to the first input terminal 27 of the operational amplifier 28.

Basic to operation is the following formula for the terminal voltage of a D-C motor armature:

$$V_A = I_a R_a + L_a \frac{di_a}{dt} + K \frac{d\theta}{dt}$$

By obvious transformation, $$K \frac{d\theta}{dt} = V_A - IR - L \frac{di_a}{dt}$$

Then $$K \frac{d\theta}{dt}$$

being the instantaneous induced voltage, is proportional to motor 1 speed irrespective of the load on the motor 1, so it presents an ideal, tachometer-like feedback signal for motor control. Hence, a circuit such as one embodying the present invention, that can isolate a signal proportional to $$K \frac{d\theta}{dt}$$

can provide tachometer speed control without a tachometer. All of the voltages produced are relative to the base line 11, which therefore determines their polarity. The first voltage take-off is at the potentiometer 21 from the voltage divider 15, (or from the armature terminal 13 if the voltage divider is eliminated) which will present a voltage proportional to armature terminal voltage, and which therefore can produce a voltage value of $K_1 V_A$. The second voltage take-off point is at the potentiometer 26 connected to the drop resistor 14 and hence it will isolate a voltage proportional to armature current and having the value $K_2 I_a R_a$. Finally, the third voltage take-off is at the potentiometer 24, which is connected to the junction 25 between the capacitor 19 and the resistance 20 of the differentiating circuit 18, and it isolates a voltage proportional to the armature voltage drop due to counter EMF having the magnitude $$K_3 \frac{di_a}{dt}$$

Since the voltage proportional to terminal voltage, $K_1 V_A$ is measured from the opposite side of the base line 11 from the other two voltages, viz., $K_2 I_a R_a$ and $$K_3 \frac{di_a}{dt}$$

the polarity of these voltages are opposites and when these voltages are algebraically added in the summing conductor 23 they will produce a voltage equal to $$K_1 V_A - K_2 I_a R_a - K_3 \frac{di_2}{dt}$$

or $$K_4 \frac{d\theta}{dt}$$

The algebraic sum of the voltages referred to above is fed to the input terminal 27 of the operational amplifier 28 on the summing conductor 23, the other input terminal 29 of the operational amplifier 28 being connected to the common base line 11. As the operational amplifier 28 is connected in the embodiments shown here, the amplified feedback signal at the output 30 of the operational amplifier is inverted relative to the feedback signal on the summing conductor 23.

The error signal generated by the comparison of the reference signal from the sliding contact 9 on the speed control potentiometer 8 and the feedback signal on the sliding contact 33 of the feedback potentiometer 32 controls the polarity and magnitude of the output of the power supply 3, which in turn governs the speed and direction of rotation of the motor 1. If the slider 9 of the speed potentiometer 8 is more positive than the slider 33 of the feedback potentiometer 32, an error signal will flow from the slider 9 on the speed potentiometer 8 through the power supply 3 and back through the feedback potentiometer 32 and the base line 11 to the reference signal source 4. On the other hand, if the slider 9 on the speed potentiometer 8 is at a lower potentiol than the slider 33 on the feedback potentiometer 32, then current will flow from the feedback potentiometer 32 through the power supply 3, the speed potentiometer 8 and the reference signal source 4 to the base line 11. Thus, the motor 1 may be energized to rotate in one direction or the other, and the magnitude of the error signal flowing through the power supply 3 will determine the magnitude of the power fed to the armature 1 and the speed of the motor 1.

The operational amplifier 28 serves to amplify the feedback signal for this particular embodiment, and in so doing it also vastly increases the signal to noise ratio so as to minimize the effect of any noise in the error, or control signal. It is conceivable that there may be embodiments of the present invention which do not employ an operational amplifier, but rather use the feedback signal taken directly from the common connected voltage take-offs at the summing point. It is essential, however, that the three voltages be of the proper, relative polarity and that they be added by connecting them together at a summing point, which in this case is the summing conductor 23. The embodiment described is the simplest, least expensive, most reliable precise, stable and durable embodiment of the invention, but by the judicious substitution and addition of known equivalents other embodiments may be created, which, nonetheless, participate in the essence of the invention. Accordingly, the invention is not to be considered as limited to the precise embodiments shown, but rather lies in the essence of that embodiment which is set forth in the claims that follow.

I claim:

1. A speed control circuit for a D-C motor which has its armature connected to be energized by a variable power supply that is responsive to an electrical control signal, the combination comprising:
    a drop resistor connected in series with said armature to said D-C motor;
    a differential circuit connected across said drop resistor and connected to at least one point between said drop resistor and said armature;
    a base line connected to said armature next to said drop resistor;
    a first voltage take-off across said armature from said base line to provide a voltage proportional to a terminal voltage of said armature;
    a second voltage take-off across said drop resistor to provide a voltage proportional to armature current;
    a third voltage take-off at said differential circuit to provide a voltage proportional to an induced voltage in said armature;
    a summing point connected in common to voltage take-offs to add said voltages algebraically, and being connected to reflect a signal proportional to the sum of said voltage to effect an electricol control signal to said variable power supply.

2. A speed control circuit for a D-C motor which has its armature connected by a conductor to be energized by a variable power supply, said variable power supply having its output to said armature responsive to an electrical control signal, the combination comprising:
    a series resistor connected by said conductor in series with said armature and said variable power supply;
    a differentiating circuit connected across said series resistor;
    a base line connected to said armature adjacent said series resistor;
    a first voltage take-off across said armature;
    a second voltage take-off across said series resistor;
    a third voltage take-off at said differentiating circuit;
    and a summing point connected in common to first, second, and third said voltage take-offs such that a polarity at said first voltage take-off is opposite to polarities at said second and third voltage take-offs to add voltages at said voltage take-offs relative to said base line algebraically, said summing point being adapted to effect a control signal to said variable power supply.

3. A speed control for a D-C motor as set forth in claim 2 wherein
    a parallel resistor is connected across said armature;
    and said second voltage take-off is across said parallel resistor.

4. A speed control circuit for a D-C motor as set forth in claim 2 wherein
    said armature of said D-C motor has terminals at its opposite ends; said series resistor is connected in series between one of said armature terminals and said variable unidirectional power supply;
    said base line is connected to said one of said armature terminals;
    and said parallel resistor is part of a high ohmic voltage divider connected across said terminals of said armature.

5. A speed control circuit for a D-C motor as set forth in claim 4 wherein said differentiating circuit is an R-C network made up of a resistor and a capacitor connected in series across said series resistor.

6. A speed control circuit for a D-C motor as set forth in claim 5 wherein
    said first voltage take-off is a variable resistor connected to an end of said parallel resistor remote from said one terminal of said armature;
    said second voltage take-off is a variable resistor connected to an end of said series resistor remote from said one terminal of said armature;
    and said third voltage take-off is a variable resistor connected between a capacitor and a resistance of said R-C network.

7. A speed control circuit for a D-C motor set forth in claim 6 wherein said summing point algebraically adds voltages from said first and second and third voltage take-offs to provide a feedback voltage proportional to the speed of said D-C motor.

8. A speed control circuit for a D-C motor as set forth in claim 7 wherein a reference signal source provides a reference voltage relative to said base line for comparison with said feedback voltage to produce an error signal as a control signal for said variable unidirectional power supply.

9. A speed control circuit for a D-C motor as set forth in claim 8 wherein
said summing point and said base line are connected to input terminals of an operational amplifier;
and an output terminal of said operational amplifier is connected to said variable power supply.

References Cited

UNITED STATES PATENTS 3,344,332  9/1967  Polries _____ 318—345 X
3,389,319  6/1968  Raber et al. _____ 318—331 X ORIS L. RADER, Primary Examiner
R. J. HICKEY, Assistant Examiner U.S. Cl. X.R.
318—332